Dec. 13, 1966 C. H. PRESBREY, JR 3,292,083
DEVICE FOR PROVIDING A PERMANENT DISPLAY OF THE PHASE
OR FREQUENCY DIFFERENCE BETWEEN SIGNALS
Filed Dec. 5, 1955 2 Sheets-Sheet 1
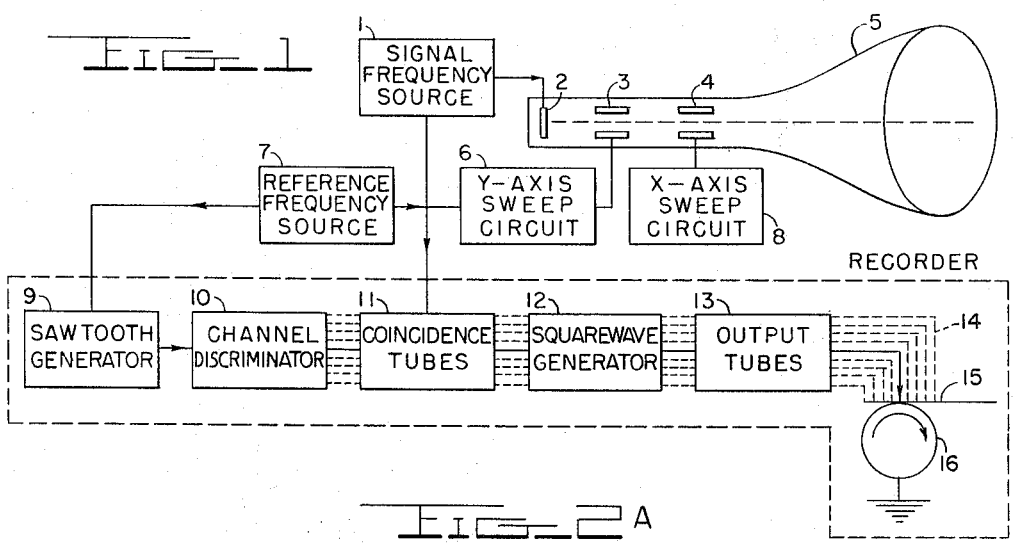
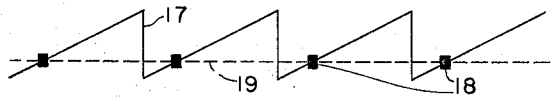
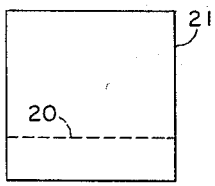
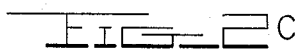
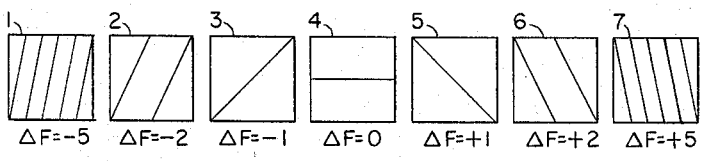
INVENTOR
CLIFTON H. PRESBREY JR.
BY
ATTORNEYS

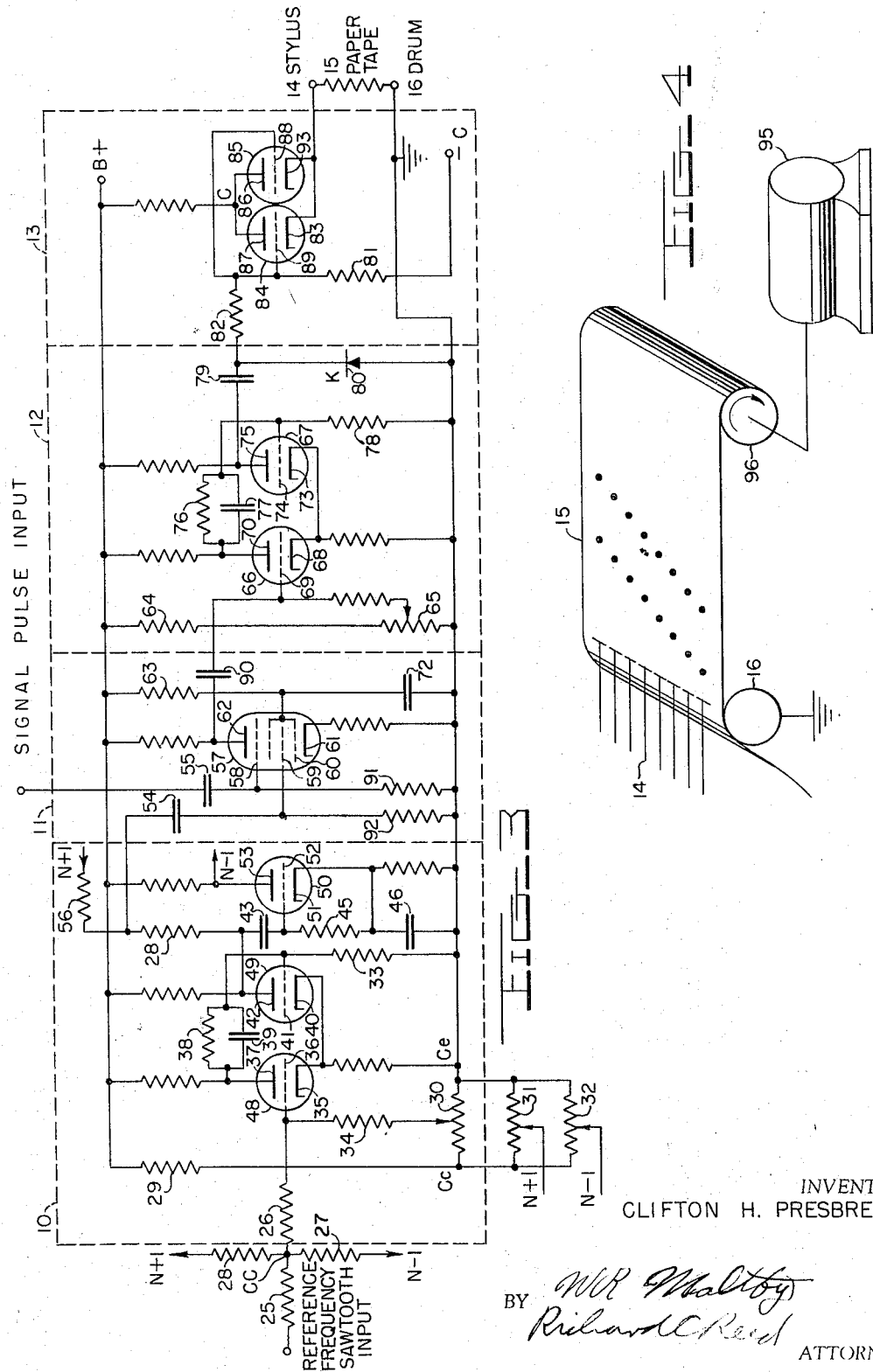

United States Patent Office

3,292,083
Patented Dec. 13, 1966

1

3,292,083
DEVICE FOR PROVIDING A PERMANENT DISPLAY OF THE PHASE OR FREQUENCY DIFFERENCE BETWEEN SIGNALS
Clifton H. Presbrey, Jr., Washington, D.C., assignor to the United States of America as represented by the Secretary of the Navy
Filed Dec. 5, 1955, Ser. No. 551,180
7 Claims. (Cl. 324—79)

The invention described herein may be manufactured and used by or for the Government of the United States of America for governmental purposes without the payment of any royalties thereon or therefor.

This invention relates to a device for producing a visual pattern representative of the phase and frequency difference between a signal frequency and a reference frequency and more particularly to means for producing a permanent graphic display of such difference.

It is known to use an oscilloscope screen to present a plot against time in a rectangular coordinate system of the phase of successive signal wave crests referred to a controlling reference frequency source. However, in prior art devices the pattern appearing on the oscilloscope screen is transitory and whenever unlimited time is required for analysis of the phase and frequency relationship between the signal frequency and the reference frequency, it is desirable that means be provided for a permanent graphic display.

Prior knowledge indicated that a continuous strip presentation of the essential signal information by means of an electro-chemical recorder system was an approach to the problem. However, the high writing speeds required to follow accurately the phase-shift patterns produced precluded the use of the usual single moving pen or stylus. Likewise a high reference frequency sweep speed makes the use of the familiar helix and printing bar arrangement common to facsimile systems impractical. In solution of this probem, the present invention utilizes a plurality of stationary styli mounted in a row transversely across a moving tape, each being energized electrically through its own channel by means of an electrical sweep or commutator.

It is an object of this invention to provide means for producing a permanent graphic display of the phase difference between a signal frequency and a reference frequency.

It is another object of this invention to provide means for producing a permanent graphic display of the frequency difference between a signal frequency and a reference frequency.

It is a further object of this invention to provide a means of energizing a plurality of stationary styli in accordance with the phase difference between a signal frequency and a reference frequency.

Still another object of this invention is to provide a means of energizing a plurality of stationary styli in accordance with the frequency difference between a signal frequency and a reference frequency.

Other objects and features of the present invention will appear more fully hereinafter from the following detailed description considered in connection with the accompanying drawings which disclose one embodiment of the invention. It is expressly understood, however, that the drawings are designed for the purposes of illustration only, and not as definition of the limits of the invention, reference for the latter purpose being had to the appended claims.

Briefly stated, the disclosed embodiment of the present invention is a means of electrically forming a pattern on moving tape which is indicative of the phase and frequency difference between the signal and reference frequencies. This is accomplished by using the reference frequency source to generate a sawtooth voltage wave which operates through an amplitude discriminator to generate pulses sequentially in a number of separate channels. Each channel contains a coincidence stage which receives two inputs. One input is a sequential pulse from the discriminator stage representing a portion of the period of the reference frequency and the second input is a pulse at the signal frequency applied through a common connection with the other channels. When the two inputs coincide in time, an output pulse is produced which is utilized to energize a stylus which is also connected to each channel. A pattern is produced by equally spaced styli, one in each channel, in a line across an electrochemical paper type which moves at a constant selected speed. When an output pulse is produced in a given channel the corresponding stylus will mark the tape with a dot thereby forming a permanent graphic record.

In order that the invention may be clearly understood and readily carried into effect, it will now be described more fully with reference to the accompanying drawings in which:

FIG. 1 is a block diagram of the present invention for providing a permanent visual display on tape in addition to a visual display on on oscilloscope of the phase and frequency differences between signal and reference frequencies;

FIG. 2a illustrates a relationship between signal and reference frequencies useful in explaining the operation of FIG. 1;

FIG. 2b illustrates the visual displays of FIG. 1 when signal and reference frequencies are the same;

FIG. 2c illustrates the visual displays of FIG. 1 for varying frequency differences between the signal and reference frequencies;

FIG. 3 is an electrical circuit diagram of one channel of the recorder of FIG. 1; and FIG. 4 is a simplified view of the multichannel, stationary styli disclosed in the present invention.

Referring now to FIG. 1 in detail, in addition to the block diagram of the recorder inclosed with a dotted line, which is the subject of the present invention, there is disclosed in simplified form an oscilloscope functioning to indicate phase and frequency differences between signal and reference frequencies. A brief description of the operation and method of this indicating means is herein included to provide background for a complete understanding of the present invention. In FIG. 1 the output of signal frequency source 1 is connected to the intensity control 2 of the cathode ray oscilloscope 5 and also to the multiple channel coincidence stage 11 of the phase recorder. Signal frequency source 1 provides a series of pulses having a selected repetition frequency. Reference frequency source 7 is connected to Y-axis sweep circuit 6 which in turn applies a linear sawtooth sweep at the reference frequency to the vertical deflection plates 3 of the cathode ray oscilloscope 5. Reference frequency source 7 is also connected to sawtooth generator 9 of the recorder. The X-axis sweep circuit 8 applies a linear sawtooth sweep at constant selected low frequencies to the horizontal deflection plates 4 of the oscilloscope 5.

The recorder as shown in the block diagrams of FIG. 1 consists of the sawtooth generator 9 for producing a sawtooth wave form at the reference frequency which is fed to the multichannel discriminator 10 through a common input. The linearly changing sawtooth voltage sweeps the channels of the discriminator producing output pulses in each of them in succession. Each channel of the discriminator is connected to a corresponding channel in the coincident stage 11. Each channel of the coincident stage 11 also receives an input in the form of a series of pulses having a selected pulse repetition frequency from the signal frequency source 1 through a common connection. Further, each channel of the coincident stage is connected to a channel of the square wave generator stage 12 which functions to amplify and invert the pulses appearing in that channel. Connected to the square wave generator stage 12 is an output stage 13 consisting of two triodes in parallel for each channel which function to produce a heavy current when a pulse appears in that channel. Each output tube is connected to a corresponding stylus 14 which makes electrical contact with electrochemical tape 15 moving at a constant speed. Drum 16 over which tape 15 rides is a grounded conductor. The multichannel discriminator 10, which could be described as a ladder discriminator, produces an output pulse to each coincidence stage in sequence for every complete cycle of the output of the sawtooth generator which is driven at the reference frequency. The details of the ladder discriminator or commutator action of discriminator 10 will be set out below in the description of FIG. 3. Each channel of the coincident stage also receives a pulse input from signal frequency source at a selected repetition frequency through a common connection with the other channels. Whenever the pulse input from channel discriminator 10 to a particular coincidence channel and the pulse input from signal frequency source 1 coincide in time, that coincidence channel produces an output pulse. This output pulse is amplified and inverted in stage 12 and is utilized to unbias the corresponding output tube of stage 13, producing the required heavy current pulse in the stylus connected to that channel suitable for marking the paper tape 15.

FIGS. 2a, 2b and 2c are intended to illustrate the presentation resulting from the use of both the cathode ray oscilloscope and the recorder of the present invention as set forth in FIG. 1. Because of similarities of the pattern resulting from the cathode ray oscilloscope presentation and that of the present invention, a brief description of the operation and interpretation of the former is set out below. The sawtooth 17 of FIG. 2a represents the Y-axis sweep at the reference frequency provided by reference frequency source 7. The spots 18 result from pulses at the repetition frequency of the signal provided by signal frequency source 1 being applied to the intensity control 2 of the cathode ray tube 5 such that the intensity of the spot on the scope screen is raised to the level of visual perception each time a pulse occurs. When repetition and reference frequencies are exactly equal, the spot occurs repeatedly at the same point in Y-axis sweep as indicated by horizontal dotted line 19. When in addition to the Y-axis linear sawtooth sweep an X-axis linear sweep 8 of a predetermined frequency is applied to the horizontal deflection plates 4, the combination of individual spots of FIG. 2a appear as a dotted horizontal line 20 on the cathode ray screen 21 as shown in FIG. 2b. Therefore a dotted horizontal line appears on the oscilloscope screen when a zero frequency difference or a zero rate of change of phase exists between the reference and repetition frequencies. Since the reference frequency source acts to generate one Y-axis sweep per cycle, the vertical dimension of cathode ray screen 21 represents one cycle of the reference frequency in time. Likewise, the horizontal dimension of the cathode ray screen 21 represents one cycle of the X-axis sweep frequency which for purposes of illustration can be one cycle per second.

FIG. 2c illustrates the pattern appearing on the cathode ray screen 21 for various relationships between the repetition and reference frequencies. It should be noted at this point that by using a long persistence screen the line appearing on therein will have a continuous appearance even though comprised of a series of spots. Since the spot deflections in the Y or vertical direction are against a linear phase scale extending from 0° to 360°, referred to the reference frequency, the position of the line on the screen remains constant if the phase difference between the repetition and reference frequencies is constant. When there is a difference between the reference and repetition frequencies the line assumes a slope whose difference from zero depends on the extent of the repetition frequency difference. For example, if the frequency of the signal is one cycle per second greater than the reference frequency, the phase will advance 360° during a one-second interval, or at the rate of one cycle per second over the reference frequency. Thus with an X-axis sweep of one cycle per second, a line will be produced on the oscilloscope making a negative angle of 45° with the X-axis as shown in FIG. 2c(5). Likewise, when the repetition frequency of incoming signal is one cycle per second less than the reference frequency, the line produced on the oscilloscope will make a positive angle of 45° with the X-axis as shown in FIG. 2c(3). Any phase change between the signals of less than one cycle per second (360° per second) results in lines having slopes less than 45°. ΔF as shown in FIG. 2c represents the difference between the repetition and reference frequencies. As ΔF increases beyond one cycle per second, the rate of phase change becomes greater than 360° per second and, for a one cycle per second horizontal sweep, additional sloping lines in parallel appear on the face of the oscilloscope as shown in FIGS. 2c(2) and 2c(6). The slope of the lines is directly proportional to ΔF as the slope increases the number of lines increases, and the spacing between the lines decreases as illustrated in FIGS. 2c(1) and 2c(7).

The detailed description of the cathode-ray oscilloscope presentation has been given above because the recorder presentation provides the same pattern developed by electrochemical marks on paper tape which can be analyzed in the same way. This is true because there is an analogy in the operation of these presentations. For example, in the cathode-ray oscilloscope presentation the Y-axis sweep is provided by a linear sweep voltage being applied to the vertical deflection plates recurring at the reference frequency. However, no visual indication is available until the intensity control Z is pulsed by a pulse at the repetition frequency and then the location of the successive pulses on the Y-axis sweep is significant of the relationship between the reference and repetition frequencies. In the recorder system of the present invention, the movement in space of the Y-axis sweep is replaced by the latter discriminator which triggers electrical pulses in separate channels in sequence. Each channel is pulsed once in sequence from the lowest to the highest biased channel for each sawtooth voltage wave which is generated at the reference frequency. In this way a sweep is developed providing a linear phase scale extending from 0° to 360°. In the instant recording system, the signal frequency, instead of pulsing an intensity control, produces a simultaneous pulse input to all of the channels of the coincidence stage through a common connection. A coincidence stage output pulse is produced in the channel receiving a signal pulse and a pulse from the ladder discriminator in coincidence. This output pulse is utilized by the corresponding stylus to mark electrochemical paper. Thus both the cathode-ray oscilloscope presentation and the recording system indicating marks are produced in a given space dimension representative of the relation in frequency and phase between the signal and reference sources. In the cathode-ray oscilloscope presentation, an X-axis linear sweep of one cycle or more per second is utilized to give the presentation another dimension. In the recording system, the movement of the electrochemical paper tape at a constant linear speed over the drum under the styli provides this additional dimension.

FIG. 3 shows in detail one channel of the recording system set out in block diagram form in FIG. 1 except for the omission of the sawtooth generator 9 which functions to develop a sawtooth voltage wave at the reference frequency and is of conventional design. Resistance 25 connects the output of the sawtooth generator 9 to all channels of the step-biased ladder discriminator 10 through common connection CC. Resistances 27 and 28 as indicated are in the input of other channels not shown. Resistance 26 connects the sawtooth wave to grid 36 of tube 48 which along with tube 49 produces a positive-going voltage in the plate output of tube 49, forming the leading edge of a pulse. It should be noted that the anodes of tubes 48 and 49, along with the anodes of tubes 50, 57, 66, 67, 84 and 85 which will be discussed below, are all connected to the B+ through resistances in a standard manner. Also it should be noted that the cathodes of tubes 48 and 49 along with the cathodes of tubes 50, 57, 66, 67, 84 and 85 are grounded through resistances in standard manner. Resistance 29 and movable tapped resistance 30 form voltage divider and are connected between B+ and ground. Grid 36 of tube 48 is connected to the tap on resistance 30 through resistance 34 such that the bias on grid 36 can be adjusted to the desired value. Connected in parallel with resistance 30 are similar movable tapped resistances 31 and 32. As indicated by legends $N-1$ and $N+1$ these movable tapped resistances are representative of ladder potentiometers placed in each of the other channels of the discriminator and which are biased such that the sawtooth input triggers each channel in sequence from the low to the high-biased channel. Legend $N-1$ indicates the channel with the discriminator biased to trigger just prior to that of channel N which is illustrated in FIG. 3. Legend $N+1$ indicates the channel with the discriminator biased to trigger just after channel N. Cathodes 35 and 40 of tubes 48 and 49 are tied together. Anode 37 of tube 48 is connected to grid 41 of tube 49 through resistance 38 and capacitance 39 in parallel. The output from tube 49 is taken from anode 42. As the sawtooth input voltage attains a desired value, determined in part by the bias of potentiometer 30, the voltage level of grid 36 will be such that tube 48 will conduct and the voltage of its plate 37 will go in a negative direction away from B+ voltage. Since grid 41 of tube 49 is connected to plate 37, it will become more negative and normally conducting tube 49 will be rendered non-conducting. With tube 49 non-conducting, the voltage of plate 42 will go to a new voltage level in a positive direction toward B+ thereby forming the leading edge of a positive pulse. By means of ladder potentiometers 30, 31 32, etc., the sawtooth voltage sweep is divided up among as many channels as desired and a similar leading edge of a positive pulse is triggered in a particular channel as the voltage rises above the value set by its potentiometer.

The output of tube 49 is connected to grid 52 of phase inverter tube 50 through a capacitance 43. The tube 50 also contains plate 53, cathode 51 and has resistance 45 and capacitance 46 in its grid to ground circuit. Plate 53 and tube 50 is labeled $N-1$ indicating that it has a connection to the next lower biased channel. The output of tube 49, forming the leading edge of a positive pulse in channel N disclosed in FIG. 3, has a fast rise time which is preserved and inverted by tube 50. This inverted pulse is then applied to an identical discriminator stage of the next lower biased channel $N-1$, in a manner to be described, to provide an equally fast decay time and thus produce a square pulse having a width controlled by the respective bias setting of successive channel ladder potentiometers. The trigger output of the channel having the highest bias in the ladder is used without benefit of an inverted feedback pulse to form the decay side of the square pulse. Instead, the bias is adjusted so that the sawtooth flyback will limit the square pulse to the same width as the other square pulses. This can be done because after the sawtooth flyback the tube in the highest biased channel corresponding to the tube 48 of channel N will no longer be conducting and the tube corresponding to the tube 49 will no longer be cut-off, thereby providing the decay side of the square pulse. Likewise, the flyback of the input sawtooth voltage returns the cross-coupled tubes in all the discriminator channels to their original condition (e.g., tube 48 cut-off and tube 49 connecting).

The output of tube 49 is also connected to one control grid 59 of coincidence tube 57 through resistance 28 and capacitance 54. It should be noted that there is fed into channel N, disclosed in FIG. 3, an inverted leading edge from the next higher biased channel $N+1$, the purpose of which is to utilize the fast rise-time of that channel to provide an equally fast decay time. Thus by algebraic addition a combined pulse having a width controlled by the respective bias settings of channel N and channel $N+1$ respectively is produced. The connection from channel $N+1$ is made through resistance 56 to the junction of resistance 28 and capacitance 54.

The coincidence tube 57 contains an anode 62, two screen grids 60, a control grid 58, a control grid 59 and a cathode 61. Coincidence tube 57 receives one input from the combined square wave considered above, and another input from the signal pulse source through capacitance 55 to control grid 58. The grid circuits of grids 58 and 59 contain biasing resistance 91 and 92 respectively. Screen elements 60 are supplied by B+ voltage through resistance 63 and by-passed to ground by capacitance 72. The biasing and operation of tube 57 is such that when both grids 58 and 59 receive simultaneous pulses, a negative output pulse is produced. This output pulse is fed to grid 69 of tube 66 through capacitance 90. Tube 66 and tube 67 are connected to operate together in a manner similar to that of tubes 48 and 49 above. Tube 66 has a plate 70 and cathode 68 in addition to grid 69. Tube 67 has a plate 75, a grid 74, and cathode 73. Cathodes 68 and 73 are connected together and have the same cathode biasing resistance. The plate 70 of tube 66 is connected to the grid 74 of tube 67 through capacitance 77 and resistance 76 in parallel. Grid 74 is grounded through resistance 78. Resistance 64 and potentiometer 65 are connected between B+ voltage and ground such that the movable arm on potentiometer 65 can be used to bias grid 69. The output from plate 75 of tube 67 is connected to the input of the output stage 13 through capacitance 79 and resistance 82 whose common connection is grounded through diode 80. The output from the coincidence tube 57 in a negative pulse and tubes 66 and 67 along with diode 80 function to invert and amplify these pulses by creating a positive square wave pulse in the following manner. In response to a negative coincidence pulse appearing on grid 69, normally conducting tube 66 is biased to the non-conducting state, causing the voltage level of its plate 70 to rise. As a result, the voltage on grid 74 of tube 67 goes positive, causing that tube to conduct such that the voltage of plate 75 goes in the negative direction to a lower value. Circuit parameters are chosen such that following the short negative pulse on grid 69, tubes 66 and 67 go back to their conducting and non-conducting states respectively, with the voltage of plate 75 going back in a positive direction to the higher value. Since this operation is repeated in each channel for every coincidence pulse produced, and since the range of operation of the recorder system herein described is such that there are many successive coincidence pulses occurring in the same channel prior to the coincidence appearing in an adjacent channel, the plural coincidence pulses generate a repetitive type square wave form on the plate 75 of tube 67. Diode 80 functions to clip off the negative portions thereof leaving only the positive excursions. These positive square wave pulses are fed to the output power stage which consists of two triodes 84 and 85 in parallel. Triode 84 has a plate 87, a grid 89 and a cathode 88 while triode 85 has a plate 86, a grid 83 and a cathode 93. Plates 86 and 87 are connected together and the junction is connected to the B+ supply through a common plate resistance. Cathodes 83 and 93 are connected together with the junction connected to a stylus 14 of the illustrated channel. The stylus 14 is connected to ground through the electrochemical paper 15 diagrammatically represented as a resistance, and the drum 16. Grids 89 and 88 are connected together and are normally biased through resistance 81 from negative source C such that the current flow through triodes 84 and 85 and the electrochemical paper is negligible. However, when positive pulses are fed to the grids 89 and 88 through capacitance 79 and resistance 82, the triodes are biased so as to conduct heavily for the duration of the pulses and the moving electrochemical paper is marked.

FIG. 4 illustrates diagrammatically the recording device. Electrochemical paper tape 15 is pulled across recording drum 16 at a constant speed by wind-up drum 96 driven by electric motor 95. A number of styli 14, one for each channel, are placed in line across the width of the paper tape 15 on its line of contact with recording drum 16. Each time a particular stylus receives current pulses from the output tubes in its channel, a mark is made on the paper tape 15. Twenty styli and corresponding channels have been found to provide a desirable and readable pattern.

Obviously many modifications and variations of the present invention are possible in the light of the above teachings. For example, it would be obvious to interchange reference and signal frequency sources such that the signal frequency was applied to the sawtooth generator and the reference frequency was applied to the second input of the coincidence stage. For this reason the use of these terms is intended to be in the "relative" sense only and any two frequency sources are intended, where the phase and frequency relationship is of interest. It is therefore to be understood that within the scope of the appended claims, the invention may be practiced otherwise than as specifically described.

What is claimed is:

1. In a frequency measuring system, a signal source providing a first series of pulses having a selected repetition frequency, signal generating means for providing a second series of pulses having a predetermined repetition frequency, a plurality of coincidence means, each adapted to provide an output signal upon the simultaneous application of at least two input signals, means connected between said signal source and said plurality of coincidence means for applying said first series of pulses in parallel to each of said plurality of coincidence means, means connected between said signal generating means and said plurality of coincidence means for applying each pulse of said second series of pulses to a respective one of said coincidence means so that each of the plurality of coincidence means provides said output signal when a pulse of said first series of pulses and a pulse of said second series of pulses is applied during the same time interval, a plurality of recording devices, means for connecting each of said plurality of recording devices to the output of a respective one of said coincidence means, a recording medium, and means for positioning said recording medium so that the operation of each of said plurality of recording devices may be recorded on said recording medium.

2. In a frequency measuring system, a first signal source providing a series of pulses having a selected repetition frequency, a plurality of coincidence means, each adapted to provide an output signal upon the simultaneous application of at least two input signals, means connected between said first signal source and said plurality of coincidence means for applying the series of pulses provided by the first signal source in parallel to each of said plurality of coincidence means, a second signal source providing a signal having a predetermined recurrence rate, a plurality of signal generating means, means connected between the output of said second signal source and said plurality of signal generating means for operating each of said plurality of signal generating means sequentially so that each of the signal generating means provides a series of signals having a repetition frequency dependent upon said recurrence rate, means connected between said plurality of signal generating means and said plurality of coincidence means for applying the series of pulses provided by each signal generating means to a respective one of said plurality of coincidence means so that each of the plurality of coincidence means provides said output signal when a pulse provided by said first signal source and a pulse provided by a signal generating means is applied during the same time interval, a plurality of recording devices, means for connecting each of said plurality of recording devices to the output of a respective one of said coincidence means, a recording medium, and means for positioning said recording medium so that the operation of each of said plurality of recording devices may be recorded on said recording medium.

3. In a frequency measuring system, a first signal source providing a series of pulses having a selected repetition frequency, a plurality of coincidence means, each adapted to provide an output signal upon the simultaneous application of at least two input signals, means connected between said first signal source and said plurality of coincidence means for applying the series of pulses provided by said first signal source in parallel to each of said plurality of coincidence means, a second signal source providing a signal having a predetermined recurrence rate, a plurality of signal generating means, each including one of a plurality of electron tubes, each having an anode, a cathode, and a control element, each of said plurality of electron tubes being biased at a different potential level, means connected between said second signal source and said plurality of signal generating means for applying said signal in parallel to each of said plurality of signal generating means whereby each of said signal generating means provides a series of signals having a repetition frequency dependent upon the recurrence rate of said signal, means connected between said plurality of signal generating means and said plurality of coincidence means for applying the series of pulses provided by each signal generating means to a respective one of said plurality of coincidence means so that each of the plurality of coincidence means provides said output signal when a pulse provided by said first signal source and a pulse provided by a signal generating means is applied during the same time interval, a plurality of recording devices, means for connecting each of said plurality of recording devices to the output of a respective one of said coincidence means, a recording medium, and means for positioning said recording medium so that the operation of each of said plurality of recording devices may be recorded on said recording medium.

4. In a frequency measuring system, a first signal source providing a series of pulses having a selected repetition frequency, a plurality of coincidence means, each adapted to provide an output signal upon the simultaneous application of at least two input signals, means connected between said first signal source and said plurality of coincidence means for applying the series of pulses provided by said first signal source in parallel to each of said plurality of coincidence means, a second signal source providing a sawtooth signal having a predetermined recurrence rate, a plurality of signal generating means, each including one of a plurality of electron tubes, each of said plurality of electron tubes being biased at a different potential level such that said plurality of electron tubes are step-biased, means connected between said second signal source and said plurality of signal generating means for applying said sawtooth signal in parallel to each of said plurality of signal generating means whereby each of said signal generating means provides a series of signals having a repetition frequency dependent upon the recurrence rate of said sawtooth signal, means connected between said plurality of signal generating means and said plurality of coincidence means for applying the series of pulses provided by each signal generating means to a respective one of said plurality of coincidence means so that each of the plurality of coincidence means provides said output signal when a pulse provided by said first signal source and a pulse provided by a signal generating means is applied during the same time interval, a plurality of recording devices, means for connecting each of said plurality of recording devices to the output of a respective one of said coincidence means, a recording medium, and means for positioning said recording medium so that the operation of each of said plurality of recording devices may be recorded on said recording medium.

5. In a frequency measuring system, a first signal source providing a series of pulses having a selected repetition frequency, a plurality of coincidence means, each adapted to provide an output signal upon the simultaneous application of at least two input signals, means connected between said first signal source and said plurality of coincidence means for applying the series of pulses provided by said first signal source in parallel to each of said plurality of coincidence means, a second signal source providing a signal having a predetermined recurrence rate, a plurality of signal generating means, each including one of a plurality of electron tubes, each of said plurality of electron tubes being biased at a different potential level, means connected between said second signal source and said plurality of signal generating means for applying said signal in parallel to each of said plurality of signal generating means whereby each of said signal generating means provides a control signal and a series of signals having a repetition frequency dependent upon the recurrence rate of said signal, means interconnecting said plurality of signal generating means for applying the control signal provided by each of said signal generating means to a different one of said plurality of signal generating means, means connected between said plurality of signal generating means and said plurality of coincidence means for applying the series of pulses provided by each signal generating means to a respective one of said plurality of coincidence means so that each of the plurality of coincidence means provides said output signal when a pulse provided by said first signal source and a pulse provided by a signal generating means are applied during the same time interval, a plurality of recording devices, means for connecting each of said plurality of recording devices to the output of a respective one of said coincidence means, a recording medium, and means for positioning said recording medium so that the operation of each of said plurality of recording devices may be recorded on said recording medium.

6. In a frequency measuring system, a first signal source providing a pulse having a selected repetition frequency, a plurality of coincidence means, each adapted to provide an output signal upon the simultaneous application of at least two input signals, means connected between said first signal source and said plurality of coincidence means for applying the series of pulses provided by said first signal source in parallel to each of said plurality of coincidence means, a second signal source providing a sawtooth signal having a predetermined recurrence rate, a plurality of signal generating means, each including one of a plurality of electron tubes, each of said plurality of electron tubes being biased at a different potential level such that said plurality of electron tubes are step-biased, means connected between said second signal source and said plurality of signal generating means for applying said sawtooth signal in parallel to each of said plurality of signal generating means whereby each of said signal generating means provides a control signal and a series of signals having a repetition frequency dependent upon the recurrence rate of said sawtooth signal, means interconnecting said plurality of signal generating means for applying the control signal provided by each of said signal generating means to the signal generating means including the electron tube biased at the next lower level, means connected between said plurality of signal generating means and said plurality of coincidence means for applying the series of pulses provided by each signal generating means to a respective one of said plurality of coincidence means so that each of the plurality of coincidence means provides said output signal when a pulse provided by said first signal source and a pulse provided by a signal generating means are applied during the same time interval, a plurality of recording devices, means for connecting each of said plurality of recording devices to the output of a respective one of said coincidence means, a recording medium, and means for positioning said recording medium so that the operation of each of said plurality of recording devices may be recorded on said recording medium.

7. In a frequency measuring system, a first signal source providing a series of pulses having a selected repetition frequency, a plurality of coincidence means, each adapted to provide an output signal upon the simultaneous application of at least two input signals, means connected between said first signal source and said plurality of coincidence means for applying the series of pulses provided by said first signal source in parallel to each of said plurality of coincidence means, a second signal source providing sawtooth signals having leading edges, trailing edges, and a predetermined recurrence rate, a plurality of signal generating means each including one of a plurality of electron tubes, each of said plurality of electron tubes being biased at a different potential level such that said plurality of electron tubes are step-biased, means connected between said second signal source and said plurality of signal generating means for applying said sawtooth signals in parallel to each of said plurality of signal generating means whereby each of said signal generating means provides a control signal and a series of square wave signals having leading edges controlled by the leading edges of said sawtooth signals, means connected between said second signal source and the signal generating means including the electron tube biased at the highest level for controlling the trailing edges of the series of square wave signals provided by the signal generating means in dependency on the trailing edges of said sawtooth signal, means interconnecting said plurality of signal generating means for controlling the trailing edges of the series of square wave signals provided by each of the signal generating means in dependency on the control signal provided by the signal generating means including the electron tube biased at the next higher level, means connected between said plurality of signal generating means and said plurality of coincidence means for applying the series of pulses provided by each signal generating means to a respective one of said plurality of coincidence means so that each of said plurality of coincidence means provides said output signal when a pulse provided by said first signal source and a pulse provided by a signal generating means are applied during the same time interval, a plurality of recording devices, means for connecting each of said plurality of recording devices to the output of a respective one of said coincidence means, a recording medium, and means for positioning said recording medium so that the operation of each of said plurality of recording devices may be recorded on said recording medium.

References Cited by the Examiner

UNITED STATES PATENTS

| | | | |
|---|---|---|---|
| 2,501,790 | 3/1950 | Silverman | 346—33 |
| 2,521,710 | 9/1950 | Gallay | 179—15 |
| 2,739,865 | 3/1956 | Willey | 346—33 |

WALTER L. CARLSON, *Primary Examiner.*

NORMAN H. EVANS, FREDERICK M. STRADER, CHESTER L. JUSTUS, *Examiners.*

L. N. DAVIS, P. F. WILLE, *Assistant Examiners.*